United States Patent
Suzuki et al.

(10) Patent No.: US 10,394,436 B2
(45) Date of Patent: Aug. 27, 2019

(54) MANIPULATION APPARATUS

(71) Applicant: DENSO CORPORATION, Kariya, Aichi-pref. (JP)

(72) Inventors: Tsuyoshi Suzuki, Kariya (JP); Shigeaki Nishihashi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 32 days.

(21) Appl. No.: 15/120,758

(22) PCT Filed: Feb. 23, 2015

(86) PCT No.: PCT/JP2015/000861
§ 371 (c)(1),
(2) Date: Aug. 23, 2016

(87) PCT Pub. No.: WO2015/133084
PCT Pub. Date: Sep. 11, 2015

(65) Prior Publication Data
US 2016/0378320 A1    Dec. 29, 2016

(30) Foreign Application Priority Data
Mar. 5, 2014    (JP) .................. 2014-042776

(51) Int. Cl.
*G06F 3/0484* (2013.01)
*G06F 3/0338* (2013.01)
(Continued)

(52) U.S. Cl.
CPC .......... *G06F 3/04847* (2013.01); *B60K 35/00* (2013.01); *B60K 37/06* (2013.01);
(Continued)

(58) Field of Classification Search
None
See application file for complete search history.

(56) References Cited

U.S. PATENT DOCUMENTS 5,734,373 A * 3/1998 Rosenberg .............. A63F 13/06
345/161
5,825,308 A * 10/1998 Rosenberg ............. G05G 9/047
341/20

(Continued)

FOREIGN PATENT DOCUMENTS

| JP | 2004258782 A | 9/2004 |
| JP | 2005250983 A | 9/2005 |

(Continued)

*Primary Examiner* — Lunyi Lao
*Assistant Examiner* — Benjamin X Casarez
(74) *Attorney, Agent, or Firm* — Harness, Dickey & Pierce, P.L.C.

(57) ABSTRACT

A manipulation apparatus includes an image display device for displaying an image containing a command portion, an operation unit manually operable by a user, a pointer display unit for displaying a pointer at a position corresponding to an operation state of an operation unit on the image displayed on the image display unit, a vibration application unit for applying vibration to the operation unit, and a direction determination unit for, based on a positional relationship between the command portion and the pointer or based on contents of the command corresponding to the command portion, determining a direction of a force that is first applied to the operation unit as the vibration by the vibration application unit when the pointer is displayed on the command portion.

3 Claims, 9 Drawing Sheets

(51) Int. Cl.
  *B60K 35/00* (2006.01)
  *G06F 3/01* (2006.01)
  *G06F 3/0362* (2013.01)
  *B60K 37/06* (2006.01)
  *G06F 3/0481* (2013.01)

(52) U.S. Cl.
  CPC ............ *G06F 3/016* (2013.01); *G06F 3/0338* (2013.01); *G06F 3/0362* (2013.01); *G06F 3/04842* (2013.01); *B60K 2350/1024* (2013.01); *B60K 2350/1048* (2013.01); *B60K 2350/355* (2013.01); *B60K 2350/921* (2013.01); *B60K 2350/925* (2013.01); *G06F 3/04817* (2013.01); *G06F 2203/015* (2013.01)

(56) References Cited

U.S. PATENT DOCUMENTS

| | | | | |
|---|---|---|---|---|
| 5,959,613 | A * | 9/1999 | Rosenberg | A63F 13/06 341/20 |
| 6,020,876 | A * | 2/2000 | Rosenberg | G06F 3/011 345/157 |
| 6,300,936 | B1 * | 10/2001 | Braun | G05B 19/00 345/156 |
| 6,433,771 | B1 * | 8/2002 | Yocum | B25J 9/1689 345/156 |
| 2004/0117084 | A1 * | 6/2004 | Mercier | B60K 37/06 701/36 |
| 2004/0167642 | A1 | 8/2004 | Matsumoto et al. | |
| 2005/0195167 | A1 | 9/2005 | Matsumoto et al. | |
| 2006/0012584 | A1 * | 1/2006 | Vassallo | G06F 3/016 345/184 |
| 2006/0095846 | A1 * | 5/2006 | Nurmi | G06F 3/016 715/701 |
| 2008/0055241 | A1 * | 3/2008 | Goldenberg | G06F 3/016 345/156 |
| 2009/0076676 | A1 * | 3/2009 | Yamamoto | G06F 3/016 701/31.4 |
| 2010/0005412 | A1 * | 1/2010 | Tauchi | G06F 3/016 715/771 |
| 2010/0117957 | A1 * | 5/2010 | Takenaka | G06F 3/016 345/156 |
| 2011/0160957 | A1 * | 6/2011 | Itoh | B60K 35/00 701/36 |
| 2012/0056811 | A1 * | 3/2012 | Tottori | G01C 21/3664 345/161 |
| 2012/0162069 | A1 * | 6/2012 | Tanaka | G06F 3/016 345/157 |
| 2016/0195937 | A1 * | 7/2016 | Tachiiri | G06F 3/0338 345/157 |

FOREIGN PATENT DOCUMENTS

| | | |
|---|---|---|
| JP | 2008108062 A | 5/2008 |
| WO | WO-2014167777 A1 | 10/2014 |

* cited by examiner

MANIPULATION APPARATUS

CROSS REFERENCE TO RELATED APPLICATIONS

This application is a U.S. National Phase Application under 35 U.S.C. 371 of International Application No. PCT/JP2015/000861 filed on Feb. 23, 2015 and published in Japanese as WO 2015/133084 A1 on Sep. 11, 2015. This application is based on and claims the benefit of priority from Japanese Patent Application No. 2014-042776 filed on Mar. 5, 2014. The entire disclosures of all of the above applications are incorporated herein by reference.

TECHNICAL FIELD

The present disclosure relates to a manipulation apparatus for operations with an image display device.

BACKGROUND ART

Various input devices for operations with an image display device are known. For example, in a known device, an image containing a command portion (e.g., icon) for inputting a command to an operation target apparatus is displayed on the image display device and a pointer is moved on the image by an operation unit (e.g., an operation knob) manually operable in two axis directions intersecting each other.

With this device, a user operates the operation unit to move the pointer onto an intended command portion and changes or determines a parameter or the like of the apparatus corresponding to the command portion. In this case, the parameter may be changed or determined when the pointer is displayed on a particular command portion for a predetermined time or longer, or when the operation unit is pressed down or twisted during the display of the pointer on the command portion.

For this kind of input devices, there are various designs for a user to easily move the pointer onto an intended command portion. For example, a proposed technology attracts the pointer to a center of a nearby icon by applying a reaction force (operation reaction force) to the operation unit using a motor or the like (for example, see Patent Literature 1).

PRIOR ART LITERATURES

Patent Literature

Patent Literature 1: JP 2005-250983A

SUMMARY OF INVENTION

The inventors of the present application have found the following concerning the input device.

It is conceivable that an input device, which displays a pointer on an intended command portion and changes or determines a parameter corresponding to the command portion, may vibrate an operation unit to inform the user that the parameter or the like has been changed or determined. In particular, by using the vibration of the operation unit, an in-vehicle input device operated by a driver of an automobile can inform the driver of the change or determination of the parameter or the like without requiring the driver to look at the image display device.

In that regard, when a vibration force direction first applied to the operation unit during the display of the pointer at an edge of the command portion coincides with an operation direction of the pointer to move away from the center of the command portion, the pointer moves out of the command portion at a moment of the vibration application. As a result, the user has to move again the pointer onto the command portion in order to continue the change or the like using the command portion. It is also conceivable that when the pointer is displayed on a disabled command portion, the vibration may be applied to the operation unit to move the pointer out of this command portion. When a command portion displayed with the pointer on the image display device is for moving or expanding or contracting a specific display separately displayed from the pointer, it may be preferable that a moving direction or an expanding contracting direction of the specific display matches the vibration force direction first applied to the operation unit.

However, even vibration application to an operation unit is not disclosed in Patent Literature 1. Specifically, there have been no studies on controlling a direction of a force that is first applied as vibration to an operation unit.

It is therefore an object of the present disclosure to provide a manipulation apparatus capable of appropriately controlling a direction of a force first applied to an operation unit as a vibration according to contents of a command corresponding to a command portion displayed with a pointer or a positional relationship between the command portion and the pointer.

A manipulation apparatus in an example of the present disclosure comprises an image display device, an operation unit, an operation state detection unit, a pointer display unit, a vibration application unit and a direction determination unit. The image display device displays an image containing a command portion for inputting a command to an operation target apparatus. The operation unit is manually operable by a user in two axis directions intersecting each other. The operation state detection unit detects an operation state of the operation unit. The pointer display unit controls the image display device so that on the image displayed on the image display unit, a pointer is displayed at a position corresponding to the operation state detected by the operation state detection unit.

Based on a positional relationship between the command portion and the pointer or based on contents of the command corresponding to the command portion, the direction determination unit determines a direction of a force that is first applied to the operation unit as a vibration by the vibration application unit when the pointer is displayed on the command portion.

In the above manipulation apparatus, it is possible to appropriately control the direction of the force first applied to the operation unit as the vibration according to the contents of the command corresponding to the command portion displayed with the pointer or the positional relationship between the command portion and the pointer.

The above manipulation apparatus may be configured such that by the direction determination unit, the direction of the force is determined to be an operation direction in which the pointer moves toward a center of the command portion when the pointer is displayed on the command portion. This can favorably prevent the pointer from moving out of the command portion.

Alternatively, when the pointer is displayed on the command portion, the direction of the force is determined, by the direction determination unit, to be an operation direction in which the pointer moves away from the center of the command portion. This can move the pointer out of the command portion by applying the vibration to the operation unit.

The above manipulation apparatus may be configured such that: the command portion is a command portion for inputting a command to move or expand or contract a specific display displayed differently from the pointer; and, when the pointer is displayed on the command portion, the direction of the force is determined by the direction determination unit to be a direction in which the specific display is moved or expanded or contracted. In this configuration, by referring to the direction of the force first applied to the operation unit as the vibration, a user can recognize the moving, expanding or contracting direction of the specific display without looking at the image display device.

BRIEF DESCRIPTION OF DRAWINGS

The above and other objects, features and advantages of the present disclosure will become more apparent from the below detailed description made with reference to the accompanying drawings. In the drawings.

EMBODIMENTS FOR CARRYING OUT INVENTION

Configuration in First Embodiment

Figure 1:
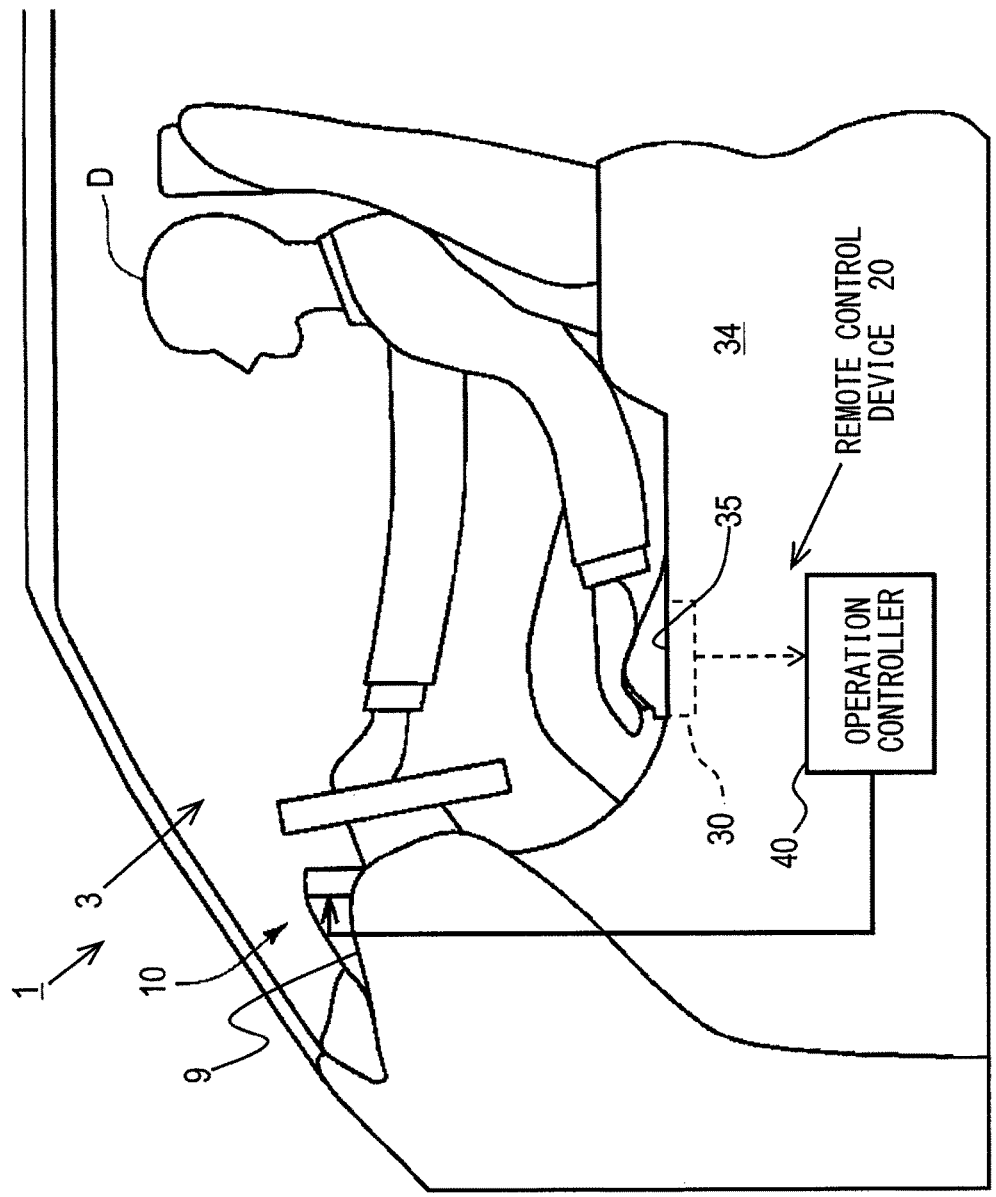
FIG. 1 is a schematic diagram illustrating a main configuration of a vehicle applied with a first embodiment.

An embodiment will be described with the drawings. As shown in FIG. 1, a manipulation apparatus of a first embodiment includes a display 10 and a remote control device 20. The display 10 is arranged in a cabin 3 of a vehicle 1 and is arranged on an upper surface or a front surface of a dashboard 9 and display various information to a driver D. The remote control device 20 includes an input device 30 and an operation controller 40. The input device 30 is attached to an attachment surface 35 provided to an upper surface of a console 34 and is configured as follows.

Figure 2:
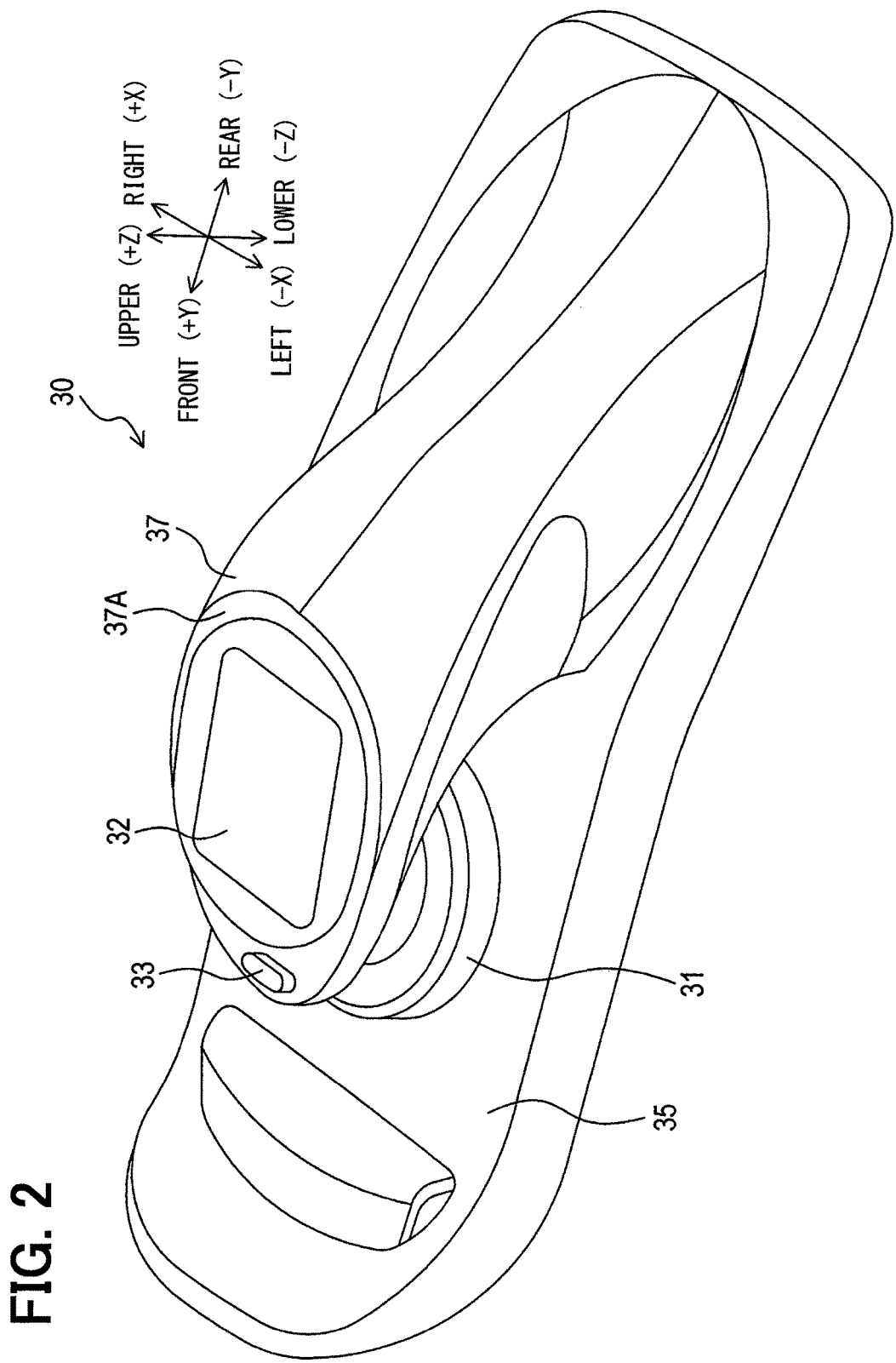
FIG. 2 is a perspective view illustrating a configuration of an input device in a vehicle.

As shown in FIG. 2, the input device 30 includes an operation knob 31, a touch pad 32 and a decision button 33 for various inputs. In the below illustration, a front direction, a rear direction, a left direction, a right direction, an upper direction and a lower direction of the driver D are assumed to be a front direction, a rear direction, a left direction, a right direction, an upper direction and a lower direction of the apparatus. As shown in FIG. 2, the description is given based on a three-dimensional rectangular coordinate system in which the right direction is a positive X-axis direction, the left direction is a negative X-axis direction, the front direction is a positive Y-axis direction, the rear direction is a negative Y-axis direction, the upper direction is a positive Z-axis direction, and the lower direction is a negative Z-axis direction. The attachment surface 35 has a portion that supports the operation knob 31 and that is planer parallel to an X-Y plane.

The operation knob 31 has a circular plate shape having a central shaft parallel to the Z-axis and is rotatable around the central axis. The operation knob 31 is slidable in the X-axis and Y-axis directions (two axis directions which are perpendicular to the axis of the rotation and which intersect each other) by a slide mechanism 36 (see FIG. 3) arranged below the attachment surface 35. The slide mechanism 36 is applicable with various known mechanisms, for example, a mechanism disclosed in JP 2005-250983A.

The input device 30 includes an extension portion 37 that extends to the above the operation knob 31 from a rear portion of the attachment surface 35. The rear portion of the attachment surface 35 is arranged rearward than the portion of the attachment surface 35 supporting the operation knob 31. The touch pad 32 and the decision button 33 are arranged on an upper surface 37A of the extension portion 37. The decision button 33 is arranged in front of the touch pad 32. The extension portion 37 and the operation knob 31 are sized so that the operation knob 31 can be pinched with the thumb and the forefinger in the left/right direction while the palm is contacting the extension portion 37 from an upper side.

Figure 3:
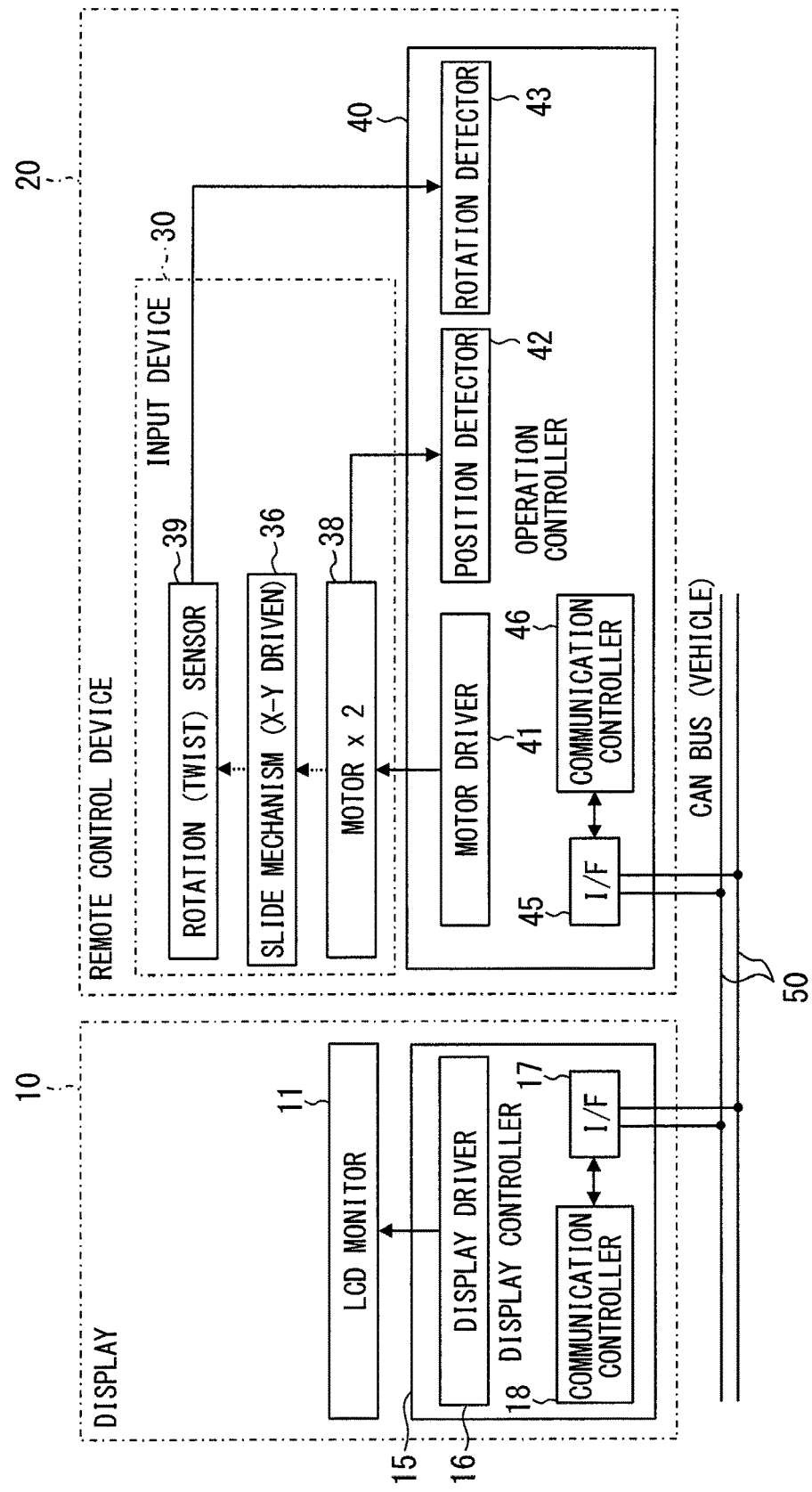
FIG. 3 is a block diagram illustrating a part of a control system in a vehicle.

FIG. 3 selectively illustrates parts relating to the operation knob 31 and the display 10 among a control system 1 of the vehicle 1. In FIG. 3, electrical connection relationships between parts are described by solid arrows and some of mechanical relationships are described by dashed-arrows. As shown in FIG. 3, the slide mechanism 36 supporting the operation knob 31 slidable in the X-axis and Y-axis directions is provided with a pair of motors 38 for applying reaction forces in the X-axis and Y-axis directions, respectively. As result, the reaction force is applicable to the operation knob 31 in any directions of 360 degrees along the X-Y plane. A mechanism for applying the reaction force to the operation knob 31 in this way is applicable with various known mechanism, for example, a mechanism disclosed in JP 2005-250983A.

A rotation sensor 39 for detecting rotation of the operation knob 31 (i.e., twisting by the driver D) is arranged to the operation knob 31. A detection signal of the rotation sensor 39 and driving amounts of the pair of motors 38 are inputted to the operation controller 40. The operation controller 40 drives the pair of motors 38.

The operation controller 40 includes a motor driver 41 for driving the pair of motors 38, a position detector 42 for detecting a positional coordinate point of the operation knob 31 in the X-axis and Y-axis directions based on the driving amounts, and a rotation detector 43 for detecting a rotation angle of the operation knob 31 based on a detection signal of the rotation sensor 39. The operation controller 40 includes a microcomputer with a CPU, a ROM and a RAM and further includes a communication controller 46 for communicating with a CAN bus 50 via an interface (I/F) 45.

The display 10 includes an LCD monitor 11 for displaying an image, and a display controller 15 for controlling a display state of the LCD monitor 11. The display controller 15 includes a microcomputer with a CPU, a ROM and a RAM and further includes a display driver 16 for driving the LCD monitor 11 and a communication controller 18 for communicating with a CAN bus 50 via an interface (I/F) 17.

Control in First Embodiment

Figure 4:
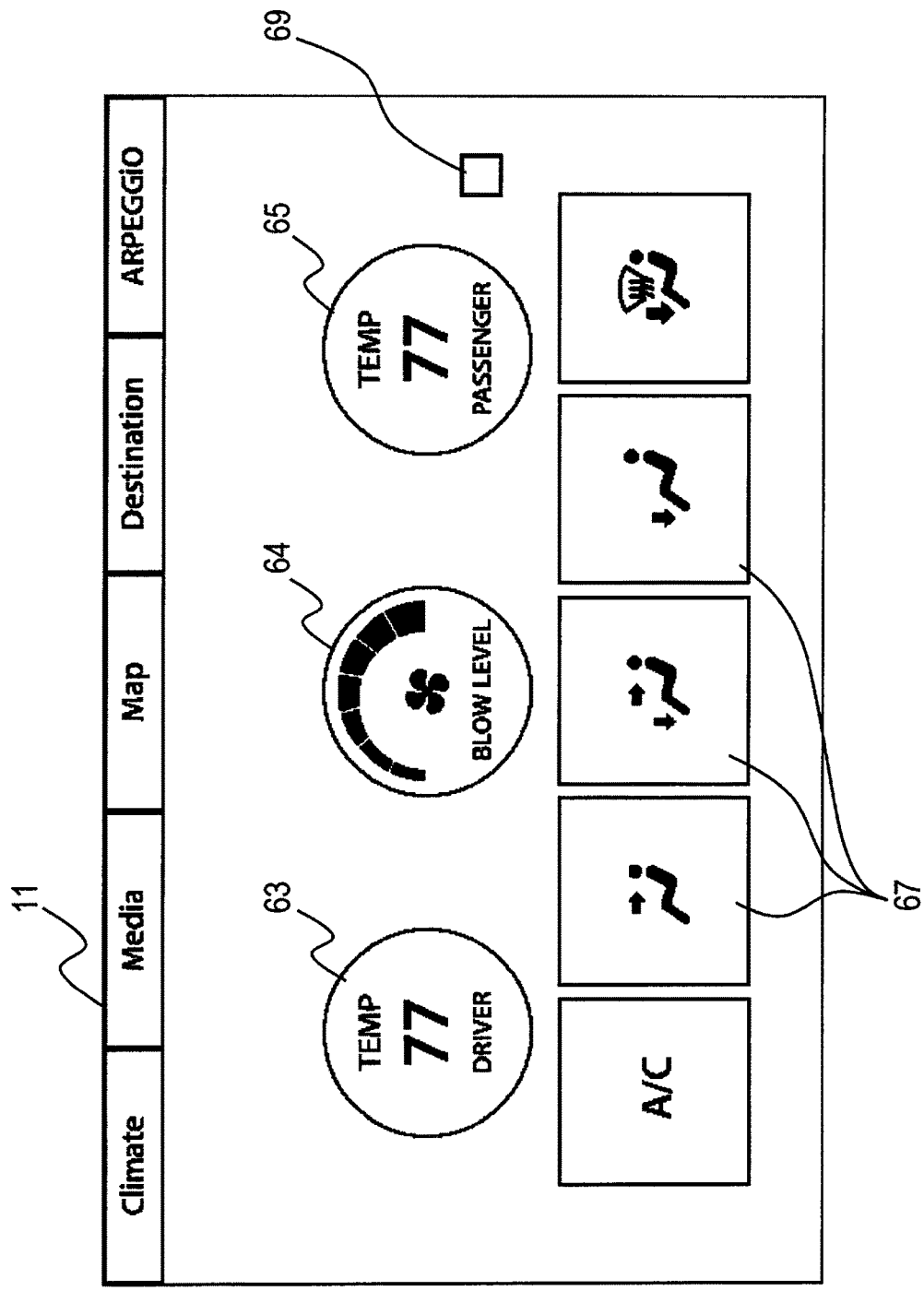
FIG. 4 is a diagram showing an example of an image displayed on a display by a control system.

FIG. 4 shows an example of a screen displayed on the LCD monitor 11. This screen is for setting concerning air conditioning in the vehicle cabin 3. The screen includes three circular icons 63, 64, 65 having circle shapes, five angular icon 67 having quadrangular shapes, and a pointer 69. The circular icon 63 is a command portion for setting a room temperature of a driver seat side. The circular con 64 is a command portion for setting a blow level. The circular icon 65 is a command portion for setting a room temperature of a front passenger seat side. The angular icon 67 is a command portion for setting ON/OFF of the air conditioning and setting air outlets. The pointer 69 is displayed at a position in the LCD monitor 11 corresponding to the position of the operation knob 31 detected by the position detector 42.

Where the operation knob 31 is manually operated in the X-axis and Y-axis directions and the pointer 69 is displayed on any one of the circular icons 63, 64 and 65, when the operation knob 31 is rotated, a numerical value or a level corresponding to the any one of the circular icons 63, 64 and 65 becomes adjustable. For example, when the operation knob 31 is rotated in a state where the pointer 69 is displayed on the circular icon 63, the setting value of the driver seat side room temperature displayed as the numerical value around the circular icon 63 is changed. In the example of FIG. 4, the temperature is displayed in Fahrenheit. Likewise, when the operation knob 31 is rotated in a state where the pointer 69 is displayed on the circular icon 65, the setting value of the front passenger seat side room temperature is changed. When the operation knob 31 is rotated in a state where the pointer 69 is displayed on the circular icon 64, the setting value of the blow level is changed.

Figure 5:
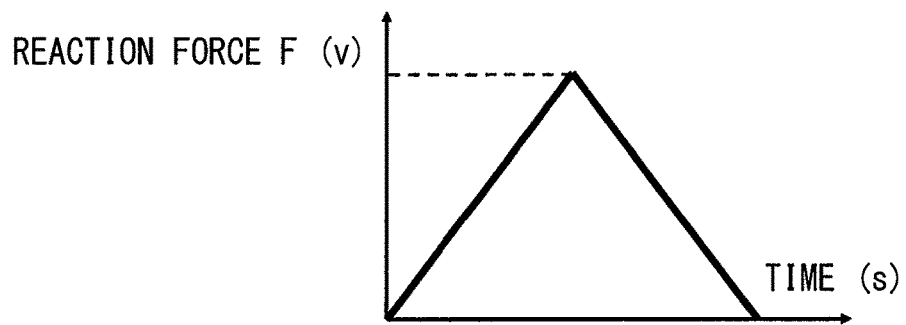
FIG. 5 is a diagram illustrating a waveform of a reaction force applied to an input device at a time of vibrating.

It is conceivable that in response to a change in various setting values in accordance with the rotation of the operation knob 31, the pair of motors 38 is driven to apply the vibration to the operation knob 31. When this control is performed, the driver D recognizes the change in the setting value without looking at the display 10. Additionally, this kind of vibration is applied by, for example, repeatedly performing in turn a process of applying the reaction force F (operation reaction force) having a triangular waveform to the operation knob 31 via the pair of motors 38 as illustrated in FIG. 5 and a process of returning the operation knob 31 back to an original position.

Figure 6:
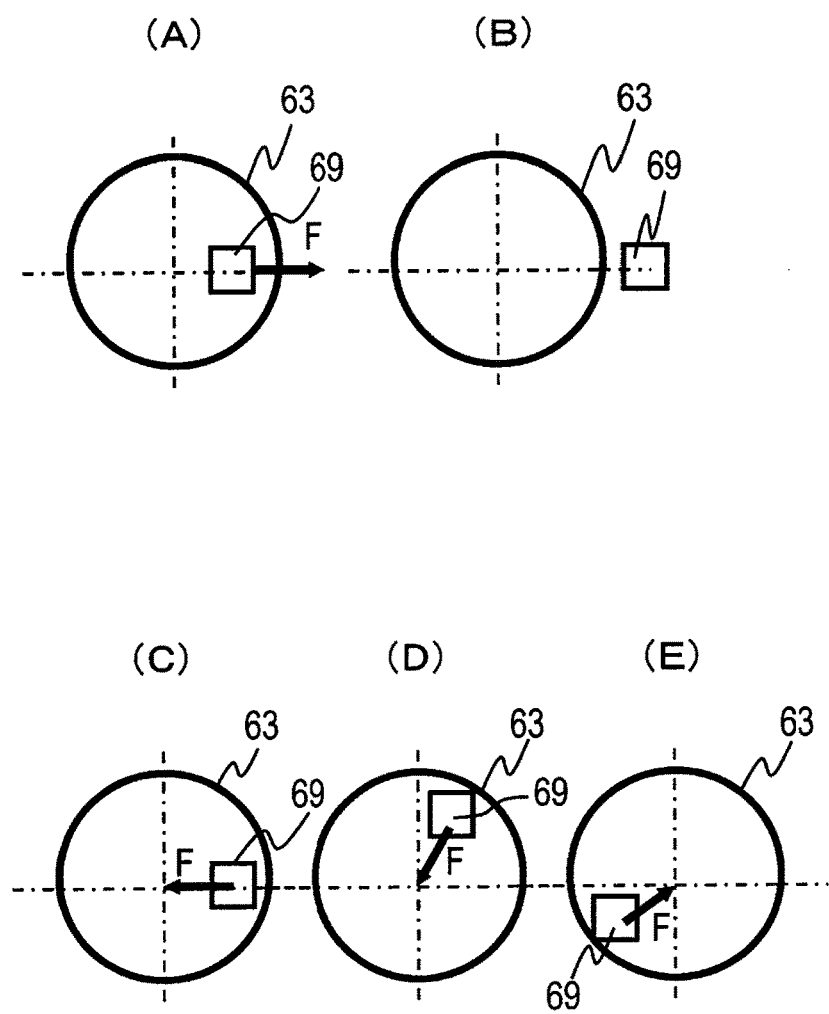
FIG. 6 (A) to (E) is a diagram illustrating a difficulty and a technical effect according to input device vibration manner.

In that regard, however, if an application direction of the reaction force F is randomly determined, the following difficulty may arise. For example, when the reaction force F is applied in the right direction (positive X-axis direction) in the case where the pointer 69 is near the right edge of the circular icon 63 as shown in FIG. 6 (A), the pointer 69 may move out of the circular icon 63 as shown in FIG. 6 (B). In particular, in cases where the force to twist the operation knob 31 is also applied from the finger of the driver D, a synergetic effect from the force applied from the finger may easily move the pointer 69 out of the circular icon 63. In FIG. 6, for illustrative purposes, the reaction force is described to the display of the display 10 but it is needless to say that the reaction force F is actually applied to the operation knob 31 in the direction corresponding to the display (the same applies to the below).

When the pointer 69 moves out of the circular icon 63 as a result of the application of the reaction force F, the driver D who would like to continue the operation of changing the setting value using the circular icon 63 has to move again the pointer 69 onto the circular icon 63. In view of this, the operation controller 40 in the present embodiment performs processing illustrated on FIG. 7 to control the reaction force F so that the application direction of the reaction force F is always a direction to the center of the circular icon 63 (and other circular icons 64, 65), as shown in FIGS. 6 (C), (D) and (E).

Figure 7:
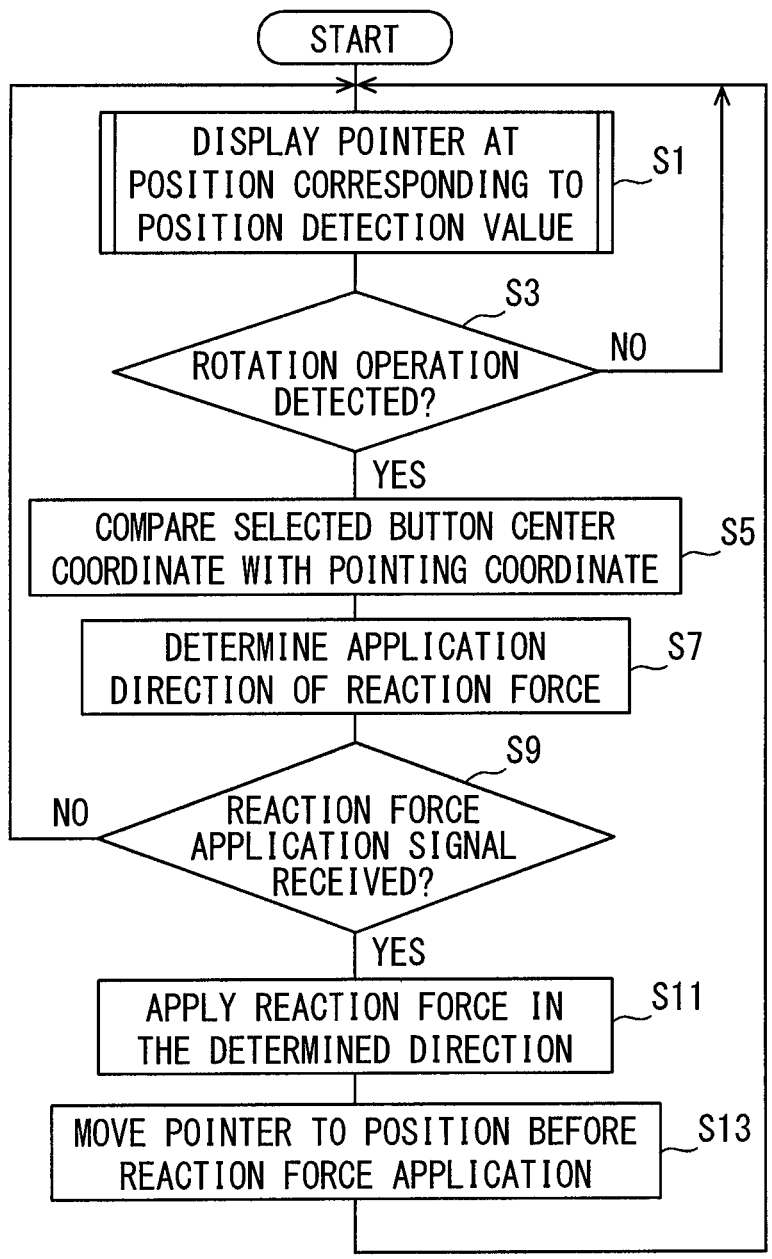
FIG. 7 is a flowchart illustrating processing performed by a control system.

During the display of the pointer 69 on the LCD monitor 11, the processing illustrated in FIG. 7 is repeatedly performed by the CPU of the operation controller 40 based on a program stored in the ROM of the operation controller 40. First, at S1 (S denotes a step, which applies to the below), a known process is performed to display the pointer 69 at a position on the LCD display 11 corresponding to the position of the operation knob 31 detected via the position detector 42. At next S3, it is determined whether or not the rotation operation of the operation knob 31 is detected via the rotation detector 43. When the rotation operation is not detected (S3: N), the processing moves to the above-described S1.

When the rotation operation is detected (S3: Y), the processing proceeds to S5. At S5, the center coordinate point of the button (any of the circular icons 63 to 65 in the example of FIG. 4) selected by the pointer 69 is compared with a pointing coordinate point pointed to by the pointer 69. At next S7, the application direction of the reaction force is determined to be the operation direction in which the pointing coordinate point moves toward the center coordinate point.

At next S9, it is determined whether or not a reaction force application signal commanding the application of the reaction force is received by the operation controller 40. This reaction force application signal is generated by processing other than this processing when there is something to be notified to the driver D, for example, the change in the setting value as described above. The reaction force application signal may be generated by, for example the display controller 15 and may be transmitted to the operation controller 40 via the CAN bus 50.

When the reaction force application signal is not received (S9: N), the processing proceeds to S1. When the reaction force application signal is received (S9: Y), the processing proceeds to S11. At S11, the reaction force is applied in the direction determined at S7. At next S13, a process for moving the operation knob 31 so as to return the pointer 69 back to the position before application of the reaction force is performed and the processing proceeds to S1. The force applied to the operation knob 31 at S13 may be remarkably weaker than the reaction force. It is noted that when the driver D strongly supports the operation knob 31 with the fingers and the operation knob 31 hardly moves in response to the application of the reaction force, the process for moving the operation knob 31 at S13 may not be performed.

Technical Effects in First Embodiment

When the screen illustrated in FIG. 4 is displayed, the above processing controls the reaction force F so that the reaction force application direction is always a direction to the center of the circular icon 63 (and other circular icons 64, 65) as shown in FIGS. 6 (C), (D) and (E). Accordingly, even when the vibration is applied to the operation knob 31 by the application of the reaction force F, the present embodiment can advantageously prevent the pointer 69 from moving out of the icon on which the pointer 69 is displayed (any of circular icons 63 to 65 in the example of FIG. 4).

The operation knob 31 of the present embodiment is rotatable around the Z-axis, and when the twist operation is performed to the operation knob 31, the setting value is changed and the vibration is applied as described above (S9). In that regard, by the controlling the application direction of the reaction force in the above described way, the present embodiment can eliminate the following difficulty; when the force to twist the operation knob 31 is applied from the fingers of the driver D, the pointer 69 easily moves out of the circular icon 63 or the like. Therefore, the technical effects becomes remarkable in the present embodiment.

Second Embodiment

Figure 8:
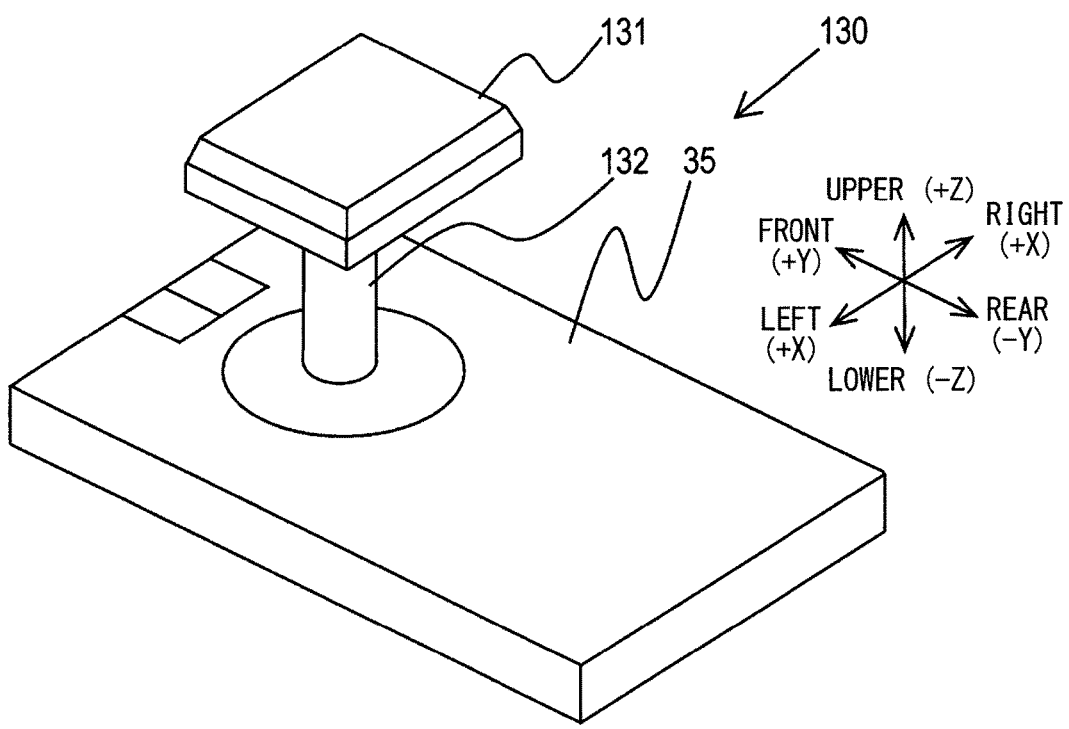
FIG. 8 is a perspective view illustrating a configuration of an input device of a second embodiment.

In a manipulation apparatus of a second embodiment, the input device 30 of the first embodiment is replaced with an input device 130 illustrated in FIG. 8. An operation knob 131 of the input device 130 is arranged above an attachment surface 35 via a lever 132. The operation knob 131 is movable in the X axis and Y-axis directions but does not rotate around the Z-axis and does not have the touch pad 32 nor the decision button 33. Commands to change setting values and the like can be issued when the operation knob 131 is pressed down in a direction to the attachment surface 35. In the present embodiment, substantially the same processing is performed as in the first embodiment. The process at S3 in FIG. 7 is replaced with a determination as to whether or not the operation knob 131 is pressed down. The determination of the application direction of the reaction force at S7 is made in the following way.

Figure 9:
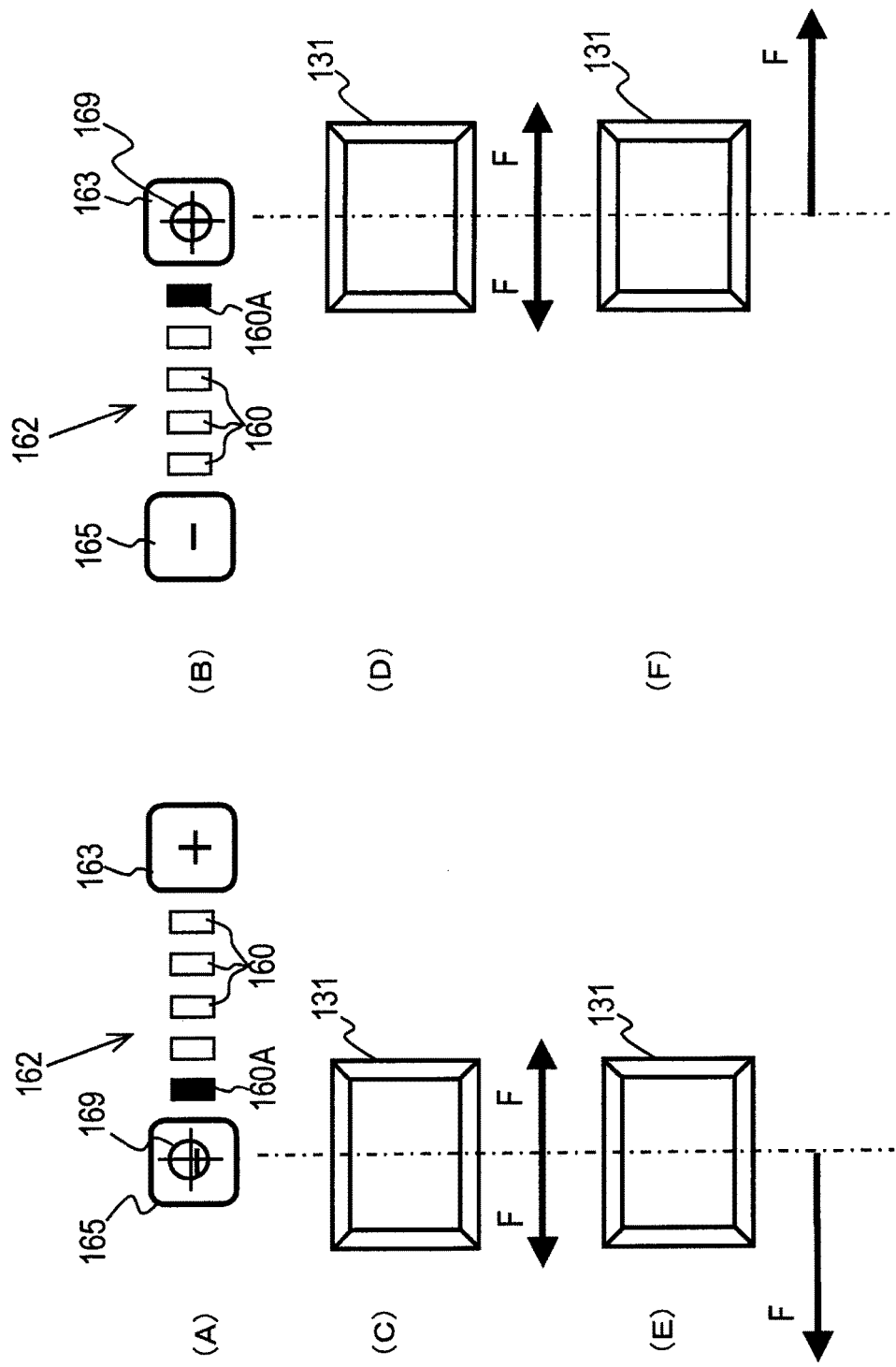
FIG. 9 (A) to (F) is a diagram illustrating a difficulty and a technical effect according to input device vibration manner.

FIGS. 9 (A) and (B) shows an example in which multiple LEDs 160 are arranged in a single line in a width direction to form a bar display 162 on the LCD monitor 11 (see FIG. 3) and icons 163, 165 are displayed at opposite ends of the bar display 162.

As shown in FIG. 9 (B), when the operation knob 131 is pressed down in a state where the pointer 169 is displayed on the icon 163 on the right side of the bar display 162, the position of the LED 160A which is lighting up among the LEDs 160 is sequentially moved in the right direction (in + direction). Along with this movement, the setting value is sequentially increased.

As shown in FIG. 9 (A), when the operation knob 131 is pressed down in a state where the pointer 169 is displayed on the icon 165 on the left side of the bar display 162, the position of the LED 160A which is lighting up among the LEDs 160 is sequentially moved in the left direction (in − direction). Along with this movement, the setting value is sequentially decreased. When the position of the lighting up LED 160A is moved in the above way, the reaction force application signal is received (S9: Y) and the vibration is applied to the operation knob 131 (S11, S13).

As shown in FIGS. 9 (C) and (D), if the application direction of the reaction force F to the operation knob 131 at S11 is not determined to be the right direction or the left direction, the driver D cannot recognize the movement direction of the lighting up LED 160A only from the vibration of the operation knob 131.

In the present embodiment, by contrast, when the operation knob 131 is pressed down in a state where the pointer 169 is displayed on the icon 165, the application direction of the reaction force F is determined at S7 to be the left direction, as shown in FIG. 9 (E). Additionally, as shown in FIG. 9 (F), when the operation knob 131 is pressed down in a state where the pointer 169 is displayed on the icon 163, the application direction of the reaction force F is determined to be the right direction. Specifically, when the display is like FIG. 9 (A) or (B), the application direction of the reaction force F is determined at S7 to match the movement direction of the lighting up LED 160A. As a result, the driver D can recognize the movement direction of the lighting up LED 160A without looking at the display 10.

This control is applicable to not only discrete LEDs 160 illustrated in FIGS. 9(A) and (B) but also a rod shape display in which LEDs are continuously arranged and a bar graph is expanded and contracted.

Figure 10:
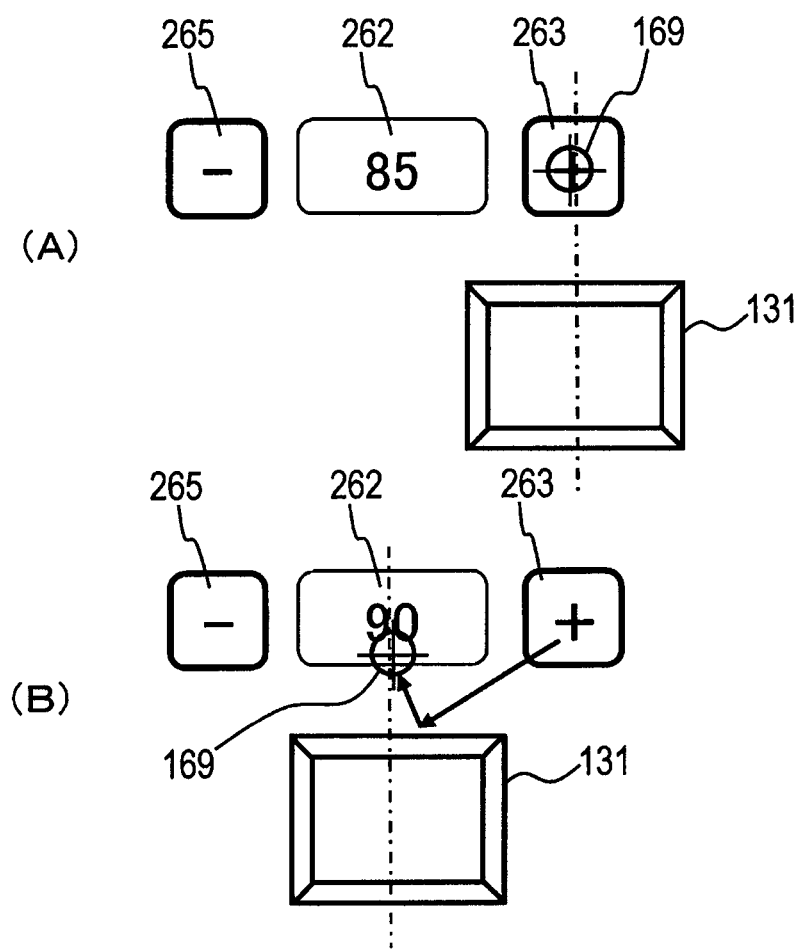
FIG. 10 (A) to (B) is a diagram illustrating other input device vibration manners.

FIG. 10 (A) illustrates another screen in this embodiment. On the screen illustrated in FIG. 10 (A), a numerical value display portion 262 for displaying the setting value by a numeral value is displayed on the LCD monitor 11 (see FIG. 3) and icons 263, 265 are displayed on a left side and a right side of the numeral value display portion 262. The icon 263 on the right side is an icon for increasing the setting value (numeral value). When the operation knob 131 is pressed down in a state where the pointer 169 is displayed on the icon 263, the setting value displayed on the numerical value display portion 262 is increased. The icon 265 on the left side is an icon for decreasing the setting value (numeral value). When the operation knob 131 is pressed down in a state where the pointer 169 is displayed on the icon 265, the setting value displayed on the numerical value display portion 262 is decreased. In the below, illustration will be given on assumption that an upper limit of the setting value displayable on the numerical value display portion 262 is 90.

FIG. 10 (A) shows an example in which the setting value displayed on the numerical value display portion 262 is 85, which is smaller than the upper limit. When the operation knob 131 is pressed down in a state where the pointer 169 is displayed on the icon 263, the setting value displayed on the numerical value display portion 262 is increased. In this case, the vibration may not be applied to the operation knob 131 or the reaction force F may be applied in the direction for the pointer 169 to move toward the center of the icon 263 like the first embodiment.

FIG. 10 (B) shows an example in which the setting value displayed on the numerical value display portion 262 is 90. When the operation knob 131 is pressed down in a state where the pointer 169 is displayed on the icon 263, this pressing down is invalid. In this case, the direction of the reaction force applied to the operation knob 131 is determined to be the operation direction in which the pointer 169 moves away from the center of the icon 263 (S7). As a result, as shown in FIG. 10 (B), the application of the reaction force causes the position of the operation knob 131 to move out of the position corresponding to the icon 263 and the pointer 169 to move out of the icon 263, as shown by the arrow in FIG. 10(B).

Therefore, based on the vibration applied to the operation knob 131, the driver D can know, without looking at the display 10, the validity of the operation on the button (the icon 263 in the example of FIG. 10) on which the pointer 169 is displayed at that time.

In the above embodiments, the circular icons 63, 64, 65 and the icons 163, 165, 263, 265 correspond to examples of command portions. The display 10 corresponds to an example of an image display device. The driver D corresponds to an example of a user. The operation knobs 31, 131 correspond to examples of an operation unit. The position detector 42 corresponds to an example of an operation state detection unit. The display driver 16 and the operation controller 40 correspond to examples of a pointer display unit. The pair of motors 38 and the operation controller 40 correspond to examples of a vibration application unit. The operation controller 40 corresponds to a direction determination unit. The operation controller 40 performing S1 corresponds to a pointer display unit. The LED 160A corresponds to a specific display. The operation controller 40 performing S11, S13 corresponds to a vibration application unit. The operation controller 40 performing S7 corresponds to a direction determination unit.

Other Embodiments

Other embodiments will be illustrated. In the above embodiments, the pair of motors 38 is used to apply the reaction force to the operation knob 31 or 131. Alternatively, other actuators such as a solenoid or the like may be used to apply the reaction force. S13 in FIG. 7 may be omitted. In this case, the reaction force application process at S11 may be repeatedly performed and thereby the operation knob 31 or 131 may be vibrated. At S11 and S13, the reaction forces having substantially the same magnitude may be applied in opposite directions. In this case also, S7 determination of the direction of the force first applied can produce the above-described technical effects.

The input device such as the operation knob 31 and the like may rotate around an axis obliquely intersecting the XY plane. The input device such as the operation knob 31, 131 and the like may not be twistable or pressable down. When the pointer is displayed on the icon or the like for a predetermined time or when other operations on the input device such as an operation on the decision button 33 are performed, the same process may be performed as when the twist or pressing down operation is performed. Embodiments are not limited to an in-vehicle manipulation apparatus. Embodiments may be directed to various technical fields.

Although embodiments and configurations of the present disclosure are illustrated, embodiments and configurations are not limited to those illustrated above and may have various forms. For example, embodiments and configurations obtained by appropriately combining technical elements disclosed in different embodiments and configurations are also embodiments and configurations of the present disclosure.

What is claimed is:

1. A manipulation apparatus comprising:
an image display device for displaying an image containing a command portion for inputting a command to change a setting value for an operation target apparatus, the command portion including a numerical value display portion for displaying the setting value as a numeric value, a first icon for increasing the setting value, and a second icon for decreasing the setting value;
an operation unit manually operable by a user in two axis directions intersecting each other;
an operation state detection unit for detecting an operation state of the operation unit;
a pointer display unit for controlling the image display device so that on the image displayed on the image display device, a pointer is displayed at a position corresponding to the operation state detected by the operation state detection unit;
a vibration application unit for applying vibration to the operation unit by generating a reaction force application signal when the setting value is changed by the inputted command to notify the user that the setting value has changed;
a direction determination unit for, based on a positional relationship between the command portion and the pointer or based on contents of the command corresponding to the command portion, determining a direction of a reaction force to be applied to the operation unit as the vibration by the vibration application unit when the pointer is displayed on the command portion, the direction of the reaction force being determined to cause the pointer to move away from a center of the first icon when the pointer is displayed on the command portion and when an invalid command is inputted that cannot change the setting value for the operation target apparatus;
wherein the vibration application unit applies the vibration to the operation unit by applying the reaction force to the operation unit in the direction determined by the direction determination unit;
wherein the command increases the setting value in response to the pointer being displayed on the first icon when the operation unit is pressed down by the user and decreases the setting value in response to the pointer being displayed on the second icon when the operation unit is pressed down by the user;
wherein the invalid command corresponds to the operation unit being pressed down by the user when the pointer is displayed on the first icon and the setting value is at a predetermined upper limit of the setting value.

2. The manipulation apparatus according to claim 1, wherein:
the first icon is displayed on a right side of the numerical value display portion; and
the second icon is displayed on a left side of the numerical value display portion.

3. A manipulation apparatus comprising:
an image display device for displaying an image containing a command portion for inputting a command to change a setting value for an operation target apparatus, the command portion including a bar display with a plurality of LEDs arranged in a single line, a first icon for sequentially moving a position of a lit LED of the plurality of LEDs in a first direction along the single line, and a second icon for sequentially moving the position of the lit LED of the plurality of LEDs in a second direction along the single line, the first direction being opposite to the second direction;
an operation unit manually operable by a user in two axis directions intersecting each other;
an operation state detection unit for detecting an operation state of the operation unit;
a pointer display unit for controlling the image display device so that on the image displayed on the image display device, a pointer is displayed at a position corresponding to the operation state detected by the operation state detection unit;
a vibration application unit for applying vibration to the operation unit by generating a reaction force application signal when the setting value is changed by the inputted command to notify the user that the setting value has changed; and
a direction determination unit for, based on a positional relationship between the command portion and the pointer or based on contents of the command corresponding to the command portion, determining direction of a reaction force a be applied to the operation unit as the vibration by the vibration application unit when the pointer is displayed on the command portion;

wherein the direction determination unit determines the direction of the reaction force to correspond to the first direction in response to the operation unit being pressed by the user when the pointer is displayed on the first icon and determines the direction of the reaction force to correspond to the second direction in response to the operation unit being pressed by the user when the pointer is displayed on the second icon, such that the direction of the reaction force matches the sequential movement of the position of the lit LED along the single line;

wherein the vibration application unit applies the vibration to the operation unit by applying the reaction force in the direction determined by the direction determination unit.

\* \* \* \* \*